United States Patent
Sasazawa et al.

(10) Patent No.: US 7,953,276 B2
(45) Date of Patent: May 31, 2011

(54) IMAGE PROCESSING APPARATUS, IMAGE PROCESSING METHOD AND IMAGE PROCESSING SYSTEM

(75) Inventors: Nobutaka Sasazawa, Kagoshima (JP); Hidekuni Moriya, Suwa (JP); Keiko Shiohara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 976 days.

(21) Appl. No.: 11/881,471

(22) Filed: Jul. 26, 2007

(65) Prior Publication Data
US 2008/0025603 A1  Jan. 31, 2008

(30) Foreign Application Priority Data
Jul. 28, 2006  (JP) .............................. P2006-206047

(51) Int. Cl.
*G06K 9/00* (2006.01)
(52) U.S. Cl. ..................................................... 382/167
(58) Field of Classification Search .................. 382/162, 382/167, 254, 274; 348/223.1, 256, 655, 348/673, 675, 679; 358/1.9, 516, 518–520; 345/589, 597
See application file for complete search history.

(56) References Cited

U.S. PATENT DOCUMENTS

| | | | |
|---|---|---|---|
| 7,221,482 B2 | 5/2007 | Yamazaki et al. | |
| 7,356,190 B2 * | 4/2008 | Mizoguchi et al. | 382/233 |
| 7,358,988 B1 | 4/2008 | Konishi et al. | |
| 7,372,597 B2 * | 5/2008 | Topfer et al. | 358/1.9 |
| 7,663,788 B2 * | 2/2010 | Kameyama | 358/518 |
| 7,702,148 B2 * | 4/2010 | Hayaishi | 382/167 |
| 7,773,158 B2 * | 8/2010 | Yamashita et al. | 348/678 |
| 2007/0297649 A1 | 12/2007 | Nakanishi | |

FOREIGN PATENT DOCUMENTS

| | | |
|---|---|---|
| JP | 08-110603 | 4/1996 |
| JP | 2000-350033 | 12/2000 |
| JP | 2001-016573 | 1/2001 |
| JP | 2001-054013 | 2/2001 |
| JP | 2002-044469 | 2/2002 |
| JP | 2002-359749 | 12/2002 |
| JP | 2005-173932 | 6/2005 |

OTHER PUBLICATIONS

Abstract of Japanese Patent Publication No. 08-110603, Pub. Date: Apr. 30, 1996, Patent Abstracts of Japan.
Abstract of Japanese Patent Publication No. 2000-350033, Pub. Date: Dec. 15, 2000, Patent Abstracts of Japan.
Abstract of Japanese Patent Publication No. 2005-173932, Pub. Date: Jun. 30, 2005, Patent Abstracts of Japan.
Abstract of Japanese Patent Publication No. 2001-054013, Pub. Date: Feb. 23, 2001, Patent Abstracts of Japan.

(Continued)

*Primary Examiner* — Jose L Couso
(74) *Attorney, Agent, or Firm* — Martine Penilla & Gencarella, LLP

(57) ABSTRACT

An image processing method of performing a color balance correction on an image, includes: determining a first value representing color and saturation of a pixel in a skin color region of the image; generating correction amount based on the first value, a second value representing ideal color and saturation of skin, and an adjusting value for adjusting a degree of the color balance correction; performing the color balance correction on the image based on the correction amount; and outputting the corrected image. The correction amount is varied depending on an output apparatus that outputs the corrected image.

9 Claims, 10 Drawing Sheets

OTHER PUBLICATIONS

Abstract of Japanese Patent Publication No. 2002-359749, Pub. Date: Dec. 13, 2002, Patent Abstracts of Japan.
Abstract of Japanese Patent Publication No. 2001-016573, Pub. Date: Jan. 19, 2001, Patent Abstracts of Japan.
Abstract of Japanese Patent Publication No. 2002-044469, Pub. Date: Feb. 8, 2002, Patent Abstracts of Japan.

* cited by examiner

IMAGE PROCESSING APPARATUS, IMAGE PROCESSING METHOD AND IMAGE PROCESSING SYSTEM

BACKGROUND

1. Technical Field

The present invention relates to a color balance correction on an image, and more particularly, to an image processing apparatus, an image processing method and an image processing system of performing a color balance correction according to a tendency of a color cast which may occur in an image.

2. Related Art

For example, when an image is generated by an image capturing operation of a digital still camera, there may occur a color cast that a particular color has an influence on the entire image because of a light source during the image capturing operation. In general, a color balance correction is performed to correct the color cast for an image.

In connection with the color balance correction on the image, JP-A-2002-44469 discloses a technique in which color correction is made to express natural human skin color and to obtain good color balance of the entire image. This technique is to make the color correction using not correction amount by use of which the human skin color expressed in the image becomes ideal human skin color, but correction amount calculated by multiplying a difference between the human skin color expressed in the image and the ideal human skin color by a constant reduction coefficient. With this color correction, the human skin color expressed in the image is corrected to approximate to the ideal human skin color, and since reduced correction amount is used, an image of which excellent color balance is maintained can be output to an image output apparatus.

However, in the above related technique, the reduction coefficient is set to match an image output characteristic of a particular image output apparatus. Accordingly, if a different image output apparatus having an image output characteristic different from that of the particular image output apparatus is used, it is not guaranteed that the color balance is excellently corrected, which may result indifference in image quality between images outputted from both apparatuses.

SUMMARY

According to an aspect of the invention, there is provided an image processing method of performing a color balance correction on an image, the method comprising:

determining a first value representing color and saturation of a pixel in a skin color region of the image;

generating correction amount based on the first value, a second value representing ideal color and saturation of skin, and an adjusting value for adjusting a degree of the color balance correction;

performing the color balance correction on the image based on the correction amount; and outputting the corrected image, wherein the correction amount is varied depending on an output apparatus that outputs the corrected image.

The present disclosure relates to the subject matter contained in Japanese patent application No. 2006-206047 filed on Jul. 28, 2006, which is expressly incorporated herein by reference in its entirety.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described with reference to the accompanying drawings.

Figure 1:
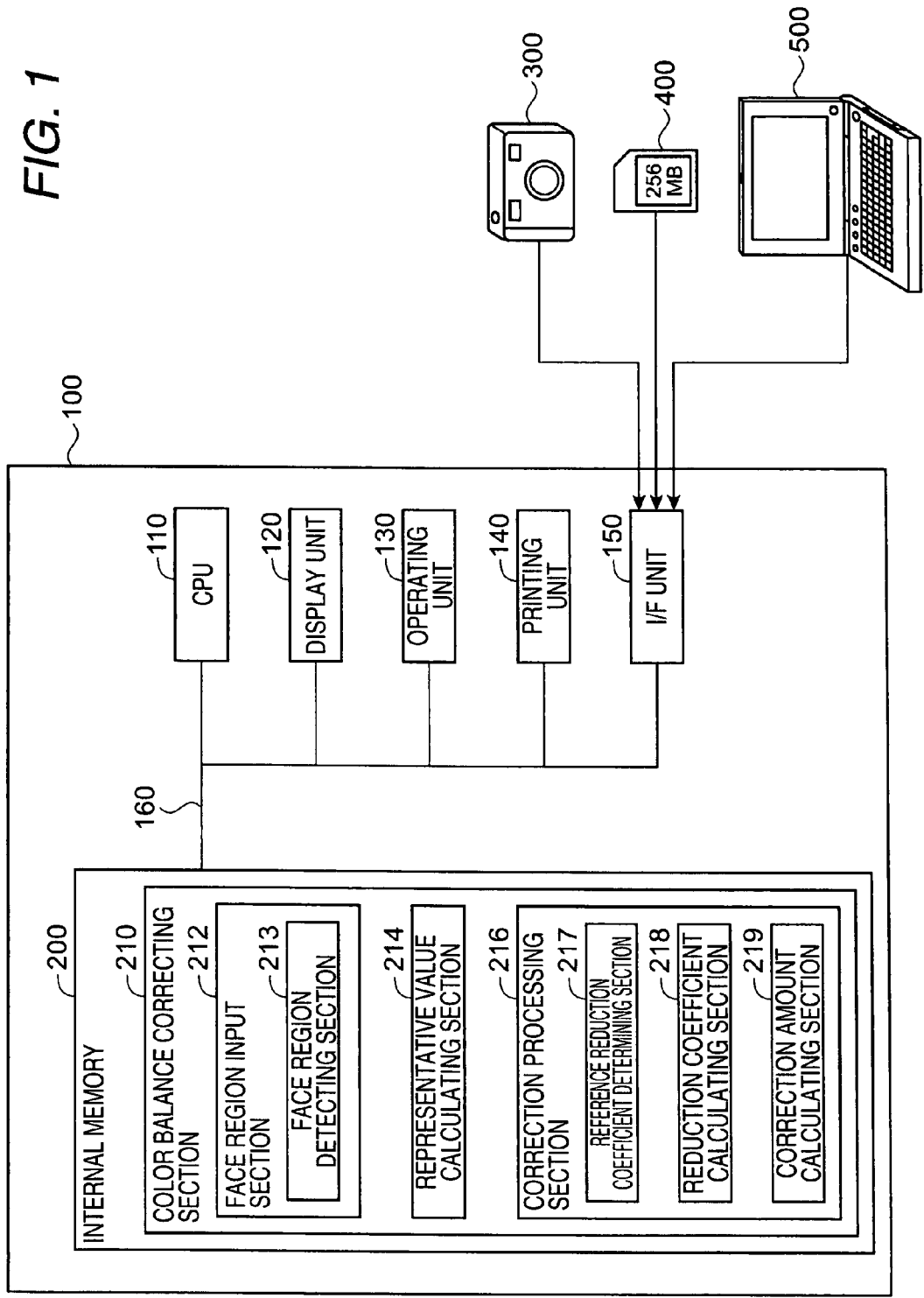
FIG. 1 is a view showing a general configuration of a printer to which an image processing apparatus according to an embodiment of the invention is applied.

FIG. 1 is a view showing a configuration of a printer 100 to which an image processing apparatus according to an embodiment of the invention is applied. The printer 100 includes a CPU 110, a display unit 120, an operating unit 130 such as buttons or keys, a printing unit 140, an I/F (Interface) unit 150, and an internal memory 200 such as a ROM, a RAM, a flash memory and the like, which are interconnected via a bus 160.

The CPU 110 reads a variety of software such as a basic control program and data which are stored in the internal memory 200, transfers the read software and data into a main memory region in a RAM, and controls various functions of the printer 100.

The display unit 120, which is one image output unit in this embodiment, includes a FPD (Flat Panel Display) such as a liquid crystal display or the like, a graphic controller and so on and displays menus selectable by a user and a print image of an image to be printed by the printing unit 140.

The printing unit 140, which is the other image output unit in this embodiment, includes a recording head, a reciprocating mechanism of the recording head, a sheet feeding mechanism and so on to form an image on a sheet by an inkjet method, based on print data generated in the printer 100. A printing method is not limited to the inkjet method, but may be a laser method, a thermal method, a dot impact method or other methods known in the art.

The I/F UNIT 150 includes an input/output terminal and exchanges information with external devices. For example, the I/F UNIT 150 is connected to a digital still camera 300 or a computer 500 via a cable or by wireless and reads image data recorded in the digital still camera 300 or print data sent from the computer 500. In addition, the I/F UNIT 150 includes a memory card slot in which a memory card 400 is inserted, and reads image data and so on recorded in the memory card 400.

The internal memory 200 includes a color balance correcting section 210. In addition, although not shown, the internal memory 200 includes an image correcting functional unit, a halftone processing functional unit and so on. These units form the image processing apparatus in this embodiment. Functions of these functional units are realized in organic cooperation of hardware and software of the printer 100.

The color balance correcting section 210 includes a face region input section 212, a representative value calculating section 214, and a correction processing section 216, in the form of a module. In addition, the correction processing section 216 includes a reference reduction coefficient determining section 217, a reduction coefficient calculating section 218 and a correction amount calculating section 219 in the form of a module. In addition, the face region input section 212 includes a face region detecting section 213 in the form of a module.

Among the above-mentioned sections, the representative value calculating section 214 has the function of calculating a representative value that represents color and saturation of pixels which are included in a skin color region and express skin color in an image, based on a signal value of the pixels included in the skin color region. In addition, the correction processing section 216 has the function of performing a color balance correction on the image by using performance correction amount that is set according to standard correction amount that is generated by multiplying a difference between the representative value and an ideal value set to represent ideal color and saturation of skin by a reduction coefficient set according to the representative value, based on a reference reduction coefficient set for a plurality of positions on a plane representing color and saturation. Functions of the above sections will be described in more detail in the following description about the color balance correction.

Figure 2:
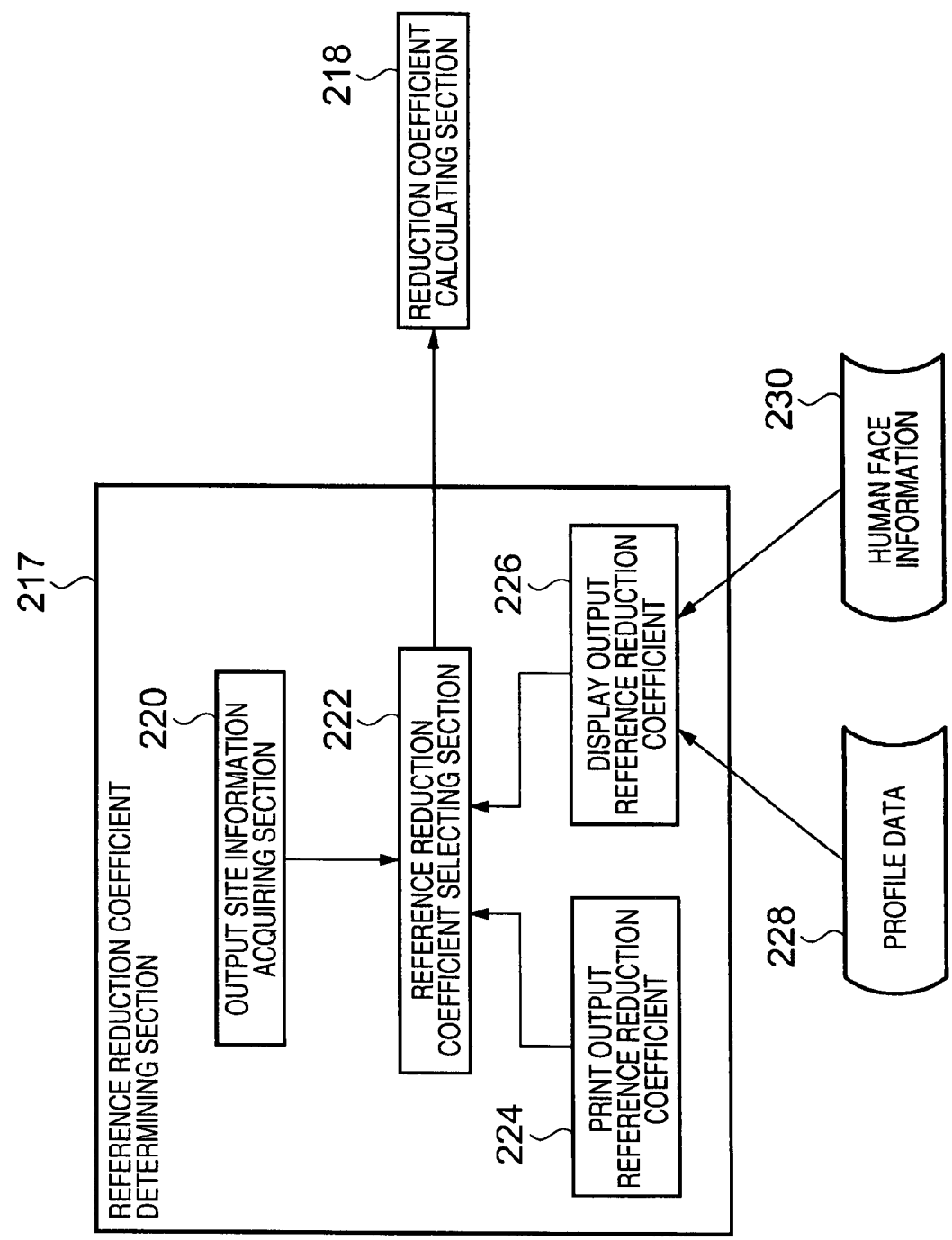
FIG. 2 is a block diagram showing a functional configuration of a reference reduction coefficient determining unit.

FIG. 2 is a block diagram showing a functional configuration of the reference reduction coefficient determining section 217. The reference reduction coefficient determining section 217 has the function of determining a reference reduction coefficient suitable for an image output characteristic of the image output unit for outputting an image having corrected color balance. In addition, the reference reduction coefficient determining section 217 includes an output site information acquiring section 220, a reference reduction coefficient selecting section 222 and at least one reference reduction coefficient. The output site information acquiring section 220 has the function of acquiring information on an output site (an output side) that outputs an image on which a color balance correction has been performed, and the reference reduction coefficient selecting section 222 has the function of selecting one of the at least one reference reduction coefficient in order to correct a difference in color of an image which occurs depending on the image output unit. In addition, information on the selected reference reduction coefficient is sent to the reduction coefficient calculating section 218.

In this embodiment, the reference reduction coefficient includes a print output reference reduction coefficient 224 and a display output reference reduction coefficient 226. The display output reference reduction coefficient 226 is prepared in advance, by sensory evaluation in order to absorb and correct a difference between image colors occurring in image display and image print and a difference between image colors occurring due to an individual difference of a display unit that displays the image, based on a display characteristic representing a characteristic for displaying the image and information on a human face. More specifically, the display characteristic includes profile data 228 representing a difference between one color space used for image print and the other color space used for image display on the display unit 120. The information on the human face includes face information 230 including the number of persons in the image and face position information. Details of the sections of the color balance correcting section 210 and the reference reduction coefficient will be described below.

Figure 3:
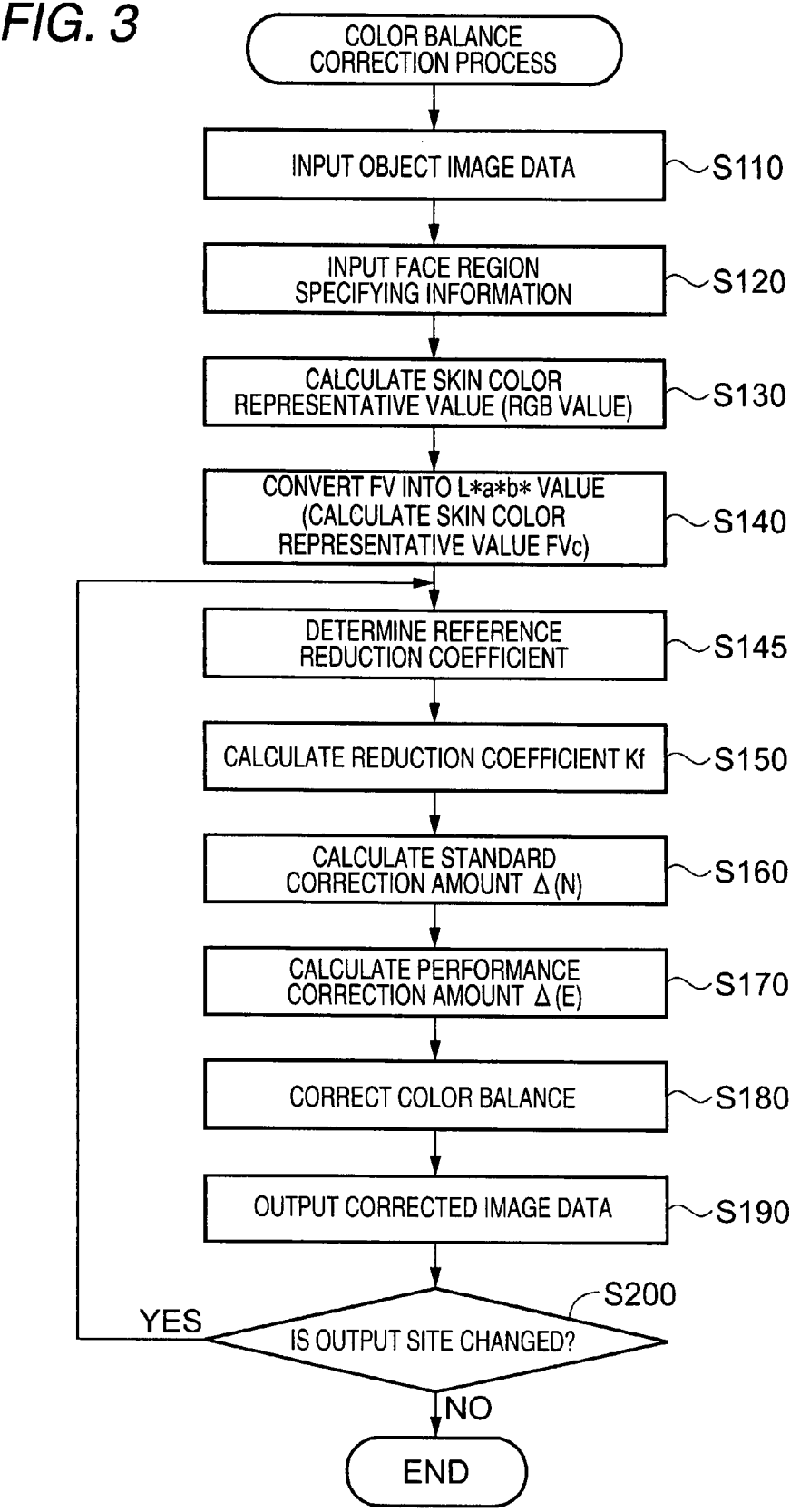
FIG. 3 is a flow chart showing a flow of process of a color balance correcting unit.

FIG. 3 is a flow chart showing a flow of process of the color balance correcting section 210 of the image processing apparatus. In this embodiment, the color balance correction is to calculate a correction amount according to a tendency of color cast assumed from human skin color expressed in the image and perform a color balance correction using the calculated correction amount.

In Step S110, the color balance correcting section 210 inputs object image data for the color balance correction. The object image data may be input from the digital still camera 300 or the memory card 400. In addition, the object image data may be image data included in print data sent from the computer 500. The input object image data are stored in a predetermined region in the internal memory 200. Although the object image data are input as RGB data in this embodiment, the object image data may be input as data expressed in a different color space.

Next, in Step S120, information specifying a face region in an object image represented by the input object image data is input to the face region input section 212. Here, the face region refers to a region expressing a human face in the object image. In addition, the information specifying the face region refers to information specifying pixels included in the face region of the object image, for example, information representing position of the pixels. In addition, the face region detecting section 213 included in the face region input section 212 may input the information specifying the face region by using a related face region detecting method (for example, the method disclosed in JP-A-2001-16573). In addition, the information specifying the face region may be input, for example, when a user specifies a face region in the object image displayed on the display unit 120.

Next, in Step S130, a representative value calculating process is performed to calculate a representative value that represents color and saturation of pixels included in a skin color region, and the representative value calculating section 214 specifies the face region from the object image and calculates a skin color representative value FV from image data corresponding to the face region. Here, the skin color representative value FV refers to a value representing human skin color expressed in the object image. In this embodiment, RGB values calculated by averaging pixel values (RGB values) of the entire pixels included in the face region of the object image for each of R, G and B values are used as the skin color representative value FV. Besides, other various indexes may be used as the skin color representative value FV. For example, a peak value in a histogram for each of R, G and B values of the entire pixels included in the face region of the object image or a median value in the same may be used as the skin color representative value FV.

Next, in Step S140, the representative value calculating section 214 converts the skin color representative value FV calculated as the RGB value into an L*a*b* value and calculates a skin color representative value FVc after the conversion. a* and b* values of the skin color representative value FVc as the L*a*b* value are values representing the color and saturation of the human skin color expressed in the object image. The skin color representative value FVc is used as an index indicating a tendency of color cast of the object image in a relation with an ideal value of the skin color, which will be described later.

Subsequently, a correction process is performed to perform a color balance correction on the image. First, in Step S145, a reference reduction coefficient determining process is performed to determine a reference reduction coefficient suitable for an image output characteristic of the image output unit that outputs an image having the corrected color balance. In this embodiment, the reference reduction coefficient determining section 217 of the correction processing section 216 determines the reference reduction coefficient according to the image output unit that outputs the object image. That is, if the image processed by the color balance correcting section 210 is printed by the printing unit 140, the reference reduction coefficient selecting section 222 acquires information indicating that the image output unit is the printing unit 140 from the output site information acquiring section 220 and selects the print output reference reduction coefficient 224 prepared for print output. On the other hand, if the image processed by the color balance correcting section 210 is displayed on the display unit 120, the reference reduction coefficient selecting section 222 acquires information indicating that the image output unit is the display unit 120 from the output site information acquiring section 220 and selects the display output reference reduction coefficient 226 prepared for display output.

Next, in Step S150, the reduction coefficient calculating section 218 of the correction processing section 216 calculates a reduction coefficient Kf based on the skin color representative value FVc. The reduction coefficient Kf represents a ratio of correction amount for a difference between human skin color expressed in the object image and ideal skin color and is set to have various values in a range of 0 to 0.8. A method of calculating the reduction coefficient Kf will be described later.

Figure 4:
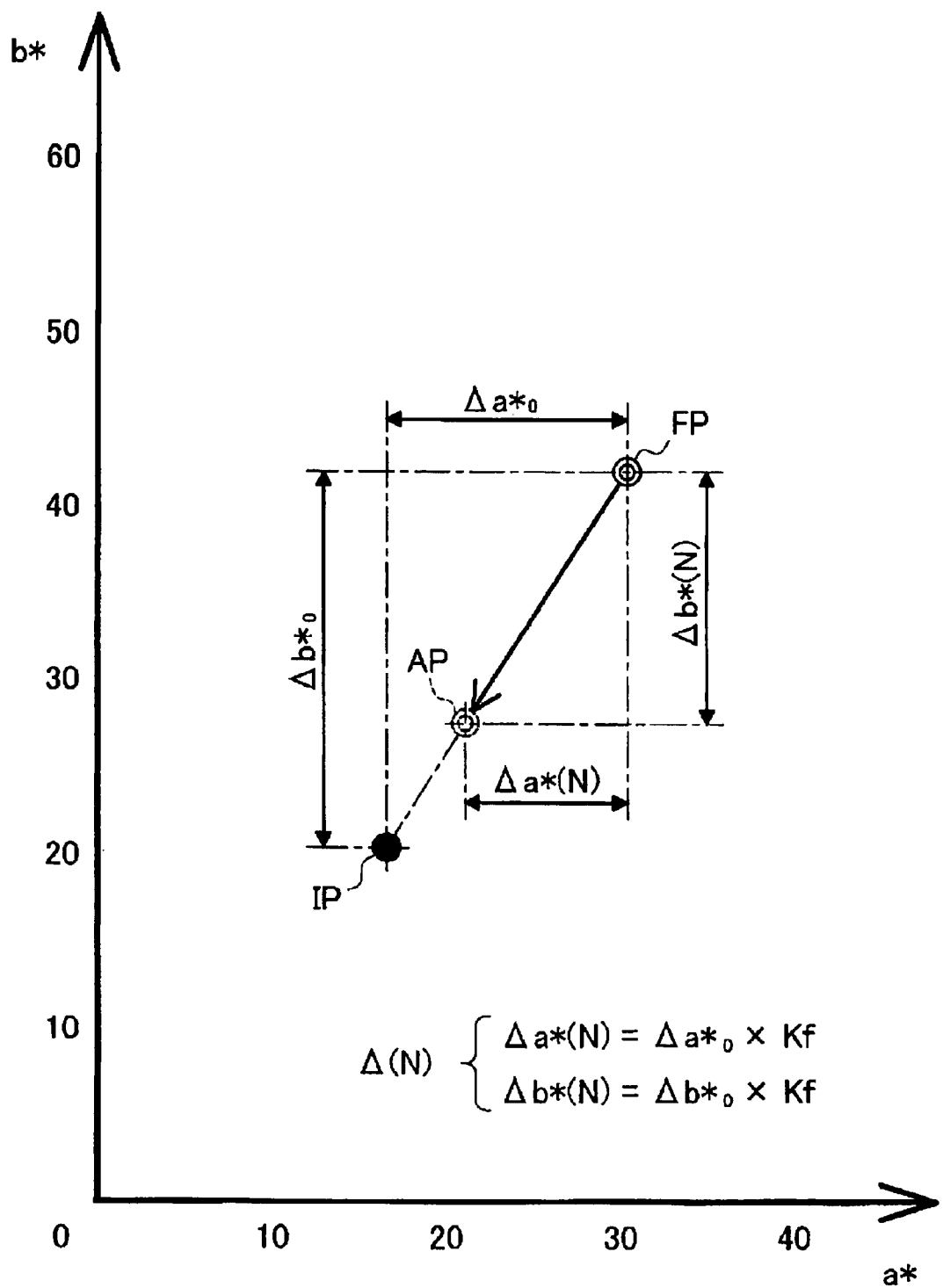
FIG. 4 is an explanatory view showing an outline of a standard correction amount calculating method.

Next, in Step S160, the correction amount calculating section 219 of the correction processing section 216 calculates standard correction amount $\Delta(N)$. FIG. 4 is an explanatory view showing an outline of a standard correction amount calculating method. FIG. 4 shows a skin color representative point FP and an ideal point IP which are plotted on an a*-b* plane representing color and saturation. Here, the skin color representative point FP is a point representing position of the skin color representative value FVc on the a*-b* plane. The ideal point is a point representing position of the ideal value expressing the ideal color and saturation of the human skin on the a*-b* plane. In this embodiment, the standard correction amount $\Delta(N)$ is expressed by a combination of a* directional standard correction amount $\Delta a^*(N)$ and b* directional standard correction amount $\Delta b^*(N)$ in the a*-b* plane. As shown in FIG. 4, the standard correction amount $\Delta(N)$ ($\Delta a^*(N)$ and $\Delta b^*(N)$) is calculated by multiplying each of differences (expressed by $\Delta a^*0$ and $\Delta b^*0$) between values of the skin color representative point FP (a* value and b* value of the skin color representative value FVc) and values (a* value and b* value) of the ideal point IP by the reduction coefficient Kf. That is, as described above, the reduction coefficient Kf is used as a ratio of the standard correction amount $\Delta(N)$ ($\Delta a^*(N)$ and $\Delta b^*(N)$) to the differences ($\Delta a^*0$ and $\Delta b^*0$) between values of the skin color representative point FP and values of the ideal point IP. The differences ($\Delta a^*0$ and $\Delta b^*0$) between values of the skin color representative point FP and values of the ideal point IP refer to a distance between the skin color representative point FP and the ideal point IP on the a*-b* plane.

The position of the ideal point IP is set based on a result of examination of user's taste. The position of the ideal point IP may be changed by a user.

The calculated standard correction amount $\Delta(N)$ is correction amount by which a pixel having the value of the skin color representative point FP is corrected to a pixel having a value of a point AP which is a point on a segment connecting the skin color representative point FP to the ideal point IP. A distance from the skin color representative point FP to the point AP is reduction coefficient Kf times as long as the segment. That is, as the reduction coefficient Kf becomes larger, the standard correction amount $\Delta(N)$ becomes correction amount by which the pixel having the value of the skin color representative point FP becomes a pixel having a value closer to the value of the ideal point IP.

Figure 5A:
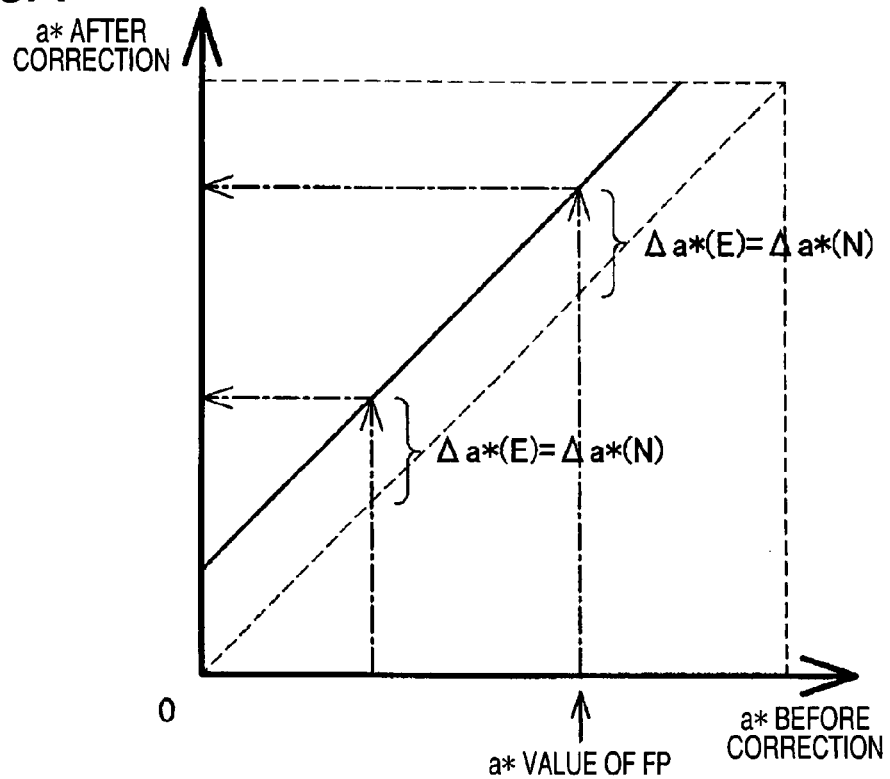
FIGS. 5A and 5B are explanatory views showing examples of a performance correction amount setting method.
Figure 5B:
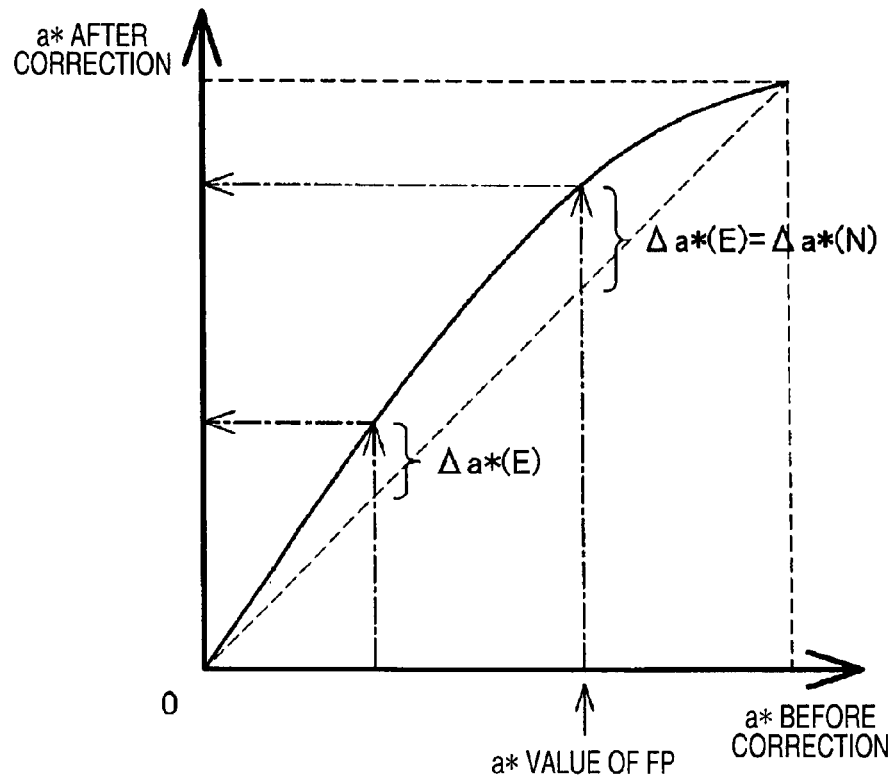

Next, in Step S170, the correction amount calculating section 219 calculates and sets performance correction amount $\Delta(E)$ based on the standard correction amount $\Delta(N)$. The performance correction amount $\Delta(E)$ is correction amount actually used when the color balance correction is performed on all pixels of the object image. FIGS. 5A and 5B are explanatory views showing examples of methods of setting performance correction amount $\Delta(E)$. FIGS. 5A and 5B show a method of setting a* directional performance correction amount $\Delta a^*(E)$ of the performance correction amount $\Delta(E)$. As shown in FIG. 5A, the a* directional performance correction amount $\Delta a^*(E)$ may be evenly set to be the same value as the standard correction amount $\Delta a^*(N)$ irrespective of an a* value before correction. In addition, as shown in FIG. 5B, the a* directional performance correction amount $\Delta a^*(E)$ corresponding to the a* value of the skin color representative point FP may be set to be the same value as the standard correction amount $\Delta a^*(N)$, and the a* directional performance correction amount $\Delta a^*(E)$ corresponding to other a* values may be set by curve (for example, spline curve) interpolation using a point having the maximum value of a* and a point having the minimum value of a*. $\Delta b^*$ directional performance correction amount $\Delta b^*(E)$ is set in the same way. The performance correction amount $\Delta(E)$ may be set based on the standard correction amount $\Delta(N)$ or by using other various setting methods.

Next, in Step S180, the correction processing section 216 performs the color balance correction on the object image using the performance correction amount $\Delta(E)$. Specifically, for all pixels of the object image, the correction processing section 216 converts an RGB value into an L*a*b* value, corrects a* and b* values of the converted L*a*b* value using the performance correction amount $\Delta(E)$ ($\Delta a^*(E)$ and $\Delta b^*(E)$), and converts the corrected L*a*b* value into an RGB value to calculate corrected image data. For example, if the performance correction amount $\Delta(E)$ is set by the method as shown in FIG. 5A, the color balance correction is performed to move positions of all pixels of the object image on the a*-b* plane in parallel by the standard correction amount $\Delta(N)$. In addition, if the performance correction amount $\Delta(E)$ is set by the method as shown in FIG. 5B, position of a pixel, which has the same value as the a* (or b*) value of the skin color representative point FP among the pixels of the object image, on the a*-b* plane is moved in parallel by the standard correction amount $\Delta(N)$, and position of other pixels is moved in parallel by respective set performance correction amount $\Delta(E)$.

Next, in Step S190, the image data having the corrected color balance are output to the image output unit assumed when the reference reduction coefficient is determined, and then the correcting process for one image output unit is ended. Specifically, the image having the corrected color balance is printed by the printing unit 140 or displayed on the display unit 120.

Next, in Step S200, it is determined whether or not the image output unit as an output site is changed. If the output site is changed (Yes in Step S200), for example, printable images are first displayed on the display unit 120, and if a user selects a desired one of these images and instructs the selected image to be printed, the flow returns to the process (Step S145) of determining the reference reduction coefficient according to the output site. As a result, since the processes (Steps S110 to S140) of inputting the object image, extracting the particular region and calculating the skin color representative value are the same irrespective of the output site, the color balance correction is performed by the use of the calculated skin color representative value FVc again according to the changed output site. On the other hand, if the output site is not changed (No in Step S200), a series of process is ended.

With the above processes, the color balance correction on the object image is performed by the use of the performance correction amount Δ(E) set based on the standard correction amount Δ(N) generated by multiplying the difference between the value of the skin color representative point FP and the value of the ideal point IP by the reduction coefficient Kf, and the object image having the corrected color balance is output from the image output unit.

Figure 6:
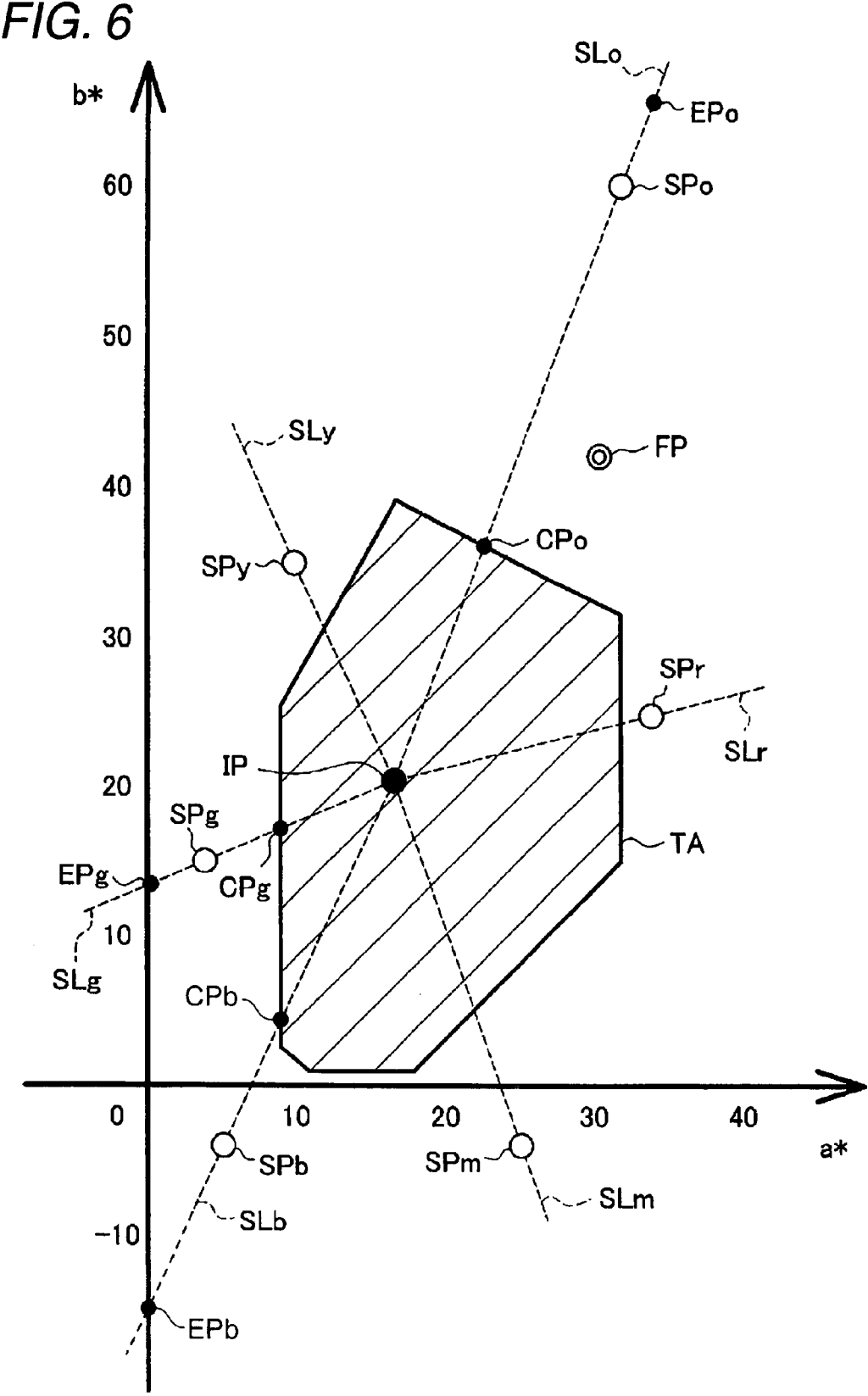
FIG. 6 is an explanatory view showing an example of a reference straight line on an a*-b* plane.

Next, a method of calculating the reduction coefficient Kf will be described. In this embodiment, the reduction coefficient Kf is calculated using a reference reduction coefficient Ks set according to a plurality of reference straight lines SL on the a* and b* plane. FIG. 6 is an explanatory view showing an example of a reference straight line SL on the a*-b* plane. Here, the reference straight line SL refers to a line representing a reference direction of color cast and a straight line connecting the ideal point IP to a reference color cast point SP. The reference color cast point SP refers to a point on the a* and b* plane on which a pixel expressing human skin color on an image captured under a reference light source is assumed to locate if color cast occurs in the image. In this embodiment, 6 reference color cast points SP are set corresponding to 6 reference light sources as shown in FIG. 6. Specifically, a yellow reference color cast pint SPy is set corresponding to a yellow reference light source, an orange reference color cast pint SPo is set corresponding to an orange reference light source, a red reference color cast pint SPr is set corresponding to a red reference light source, a magenta reference color cast pint SPm is set corresponding to a magenta reference light source, a blue reference color cast pint SPb is set corresponding to a blue reference light source, and a green reference color cast pint SPg is set corresponding to a green reference light source. 6 reference straight lines SL (SLy, SLo, SLr, SLm, SLb and SLg) are set corresponding to the 6 reference color cast points SP.

As shown in FIG. 6, a target region TA (a hatched portion in FIG. 6) on which human skin color expressed on the a* and b* plane in an image is preferably located is set on the a* and b* plane.

Figure 7A:
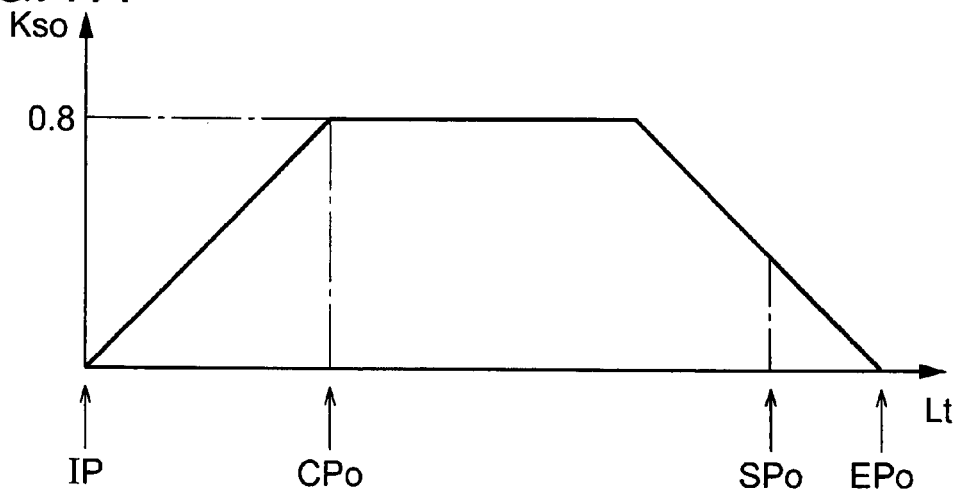
FIGS. 7A, 7B and 7C are explanatory views showing examples of a reference reduction coefficient for print output.
Figure 7B:
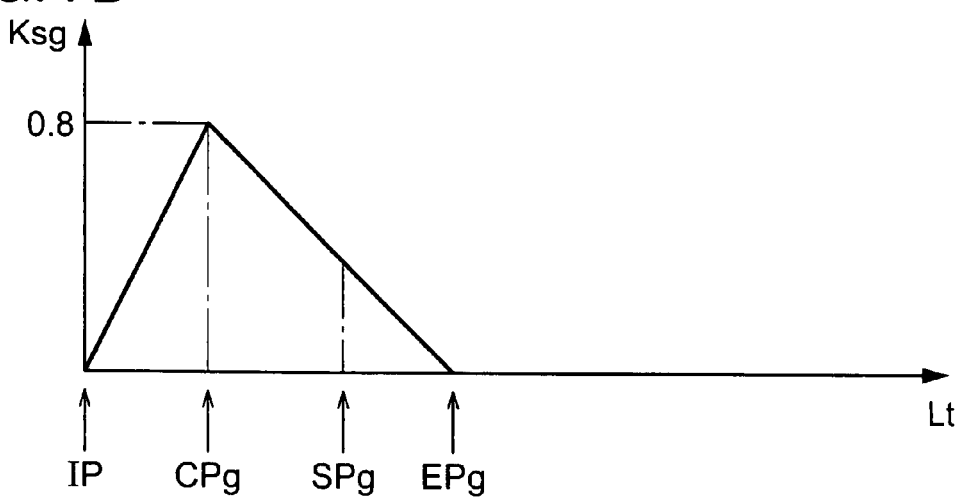
Figure 7C:
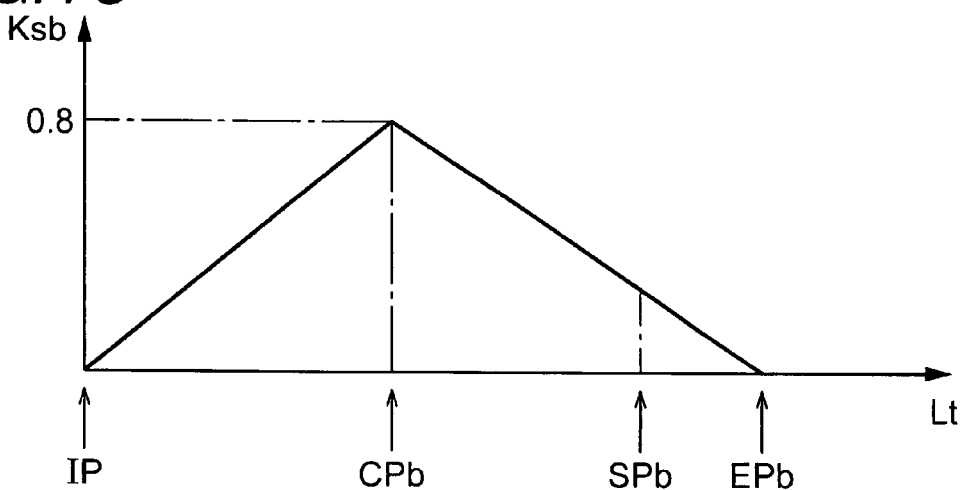

The reference reduction coefficient Ks is set along each of the reference straight lines SL. FIGS. 7A, 7B and 7C are explanatory views showing an example of a reference reduction coefficient 224 (Ks) for print output. This reference reduction coefficient Ks is a reference reduction coefficient set according to a distance from the ideal point IP representing a degree of color cast along the reference straight line SL representing a direction of color cast corresponding to a reference light source. In this embodiment, 6 reference reduction coefficients Ks are set along 6 reference straight lines SL. FIG. 7A shows an example of a reference reduction coefficient Kso along the orange reference straight line SLo (FIG. 6), FIG. 7B shows an example of a reference reduction coefficient Ksg along the green reference straight line SLg (FIG. 6), and FIG. 7C shows an example of a reference reduction coefficient Ksb along the blue reference straight line SLb (FIG. 6). In FIGS. 7A to 7C, Lt represents the distance from the ideal point IP.

For example, as shown in FIG. 7A, as the distance Lt increases from 0, the reference reduction coefficient Kso along the orange reference straight line SLo increases to the maximum value (0.8) at a point CPo (see FIG. 6) on a circumference of the target region TA. With further increase of the distance Lt, the reference reduction coefficient Kso remains at the maximum value for a while, and thereafter decreases. When the distance Lt is at a threshold point EPo (see FIG. 6) farther than the reference color cast point SPo, the reference reduction coefficient Kso is 0.

In addition, as shown in FIG. 7B, as the distance Lt increases from 0, the reference reduction coefficient Ksg along the green reference straight line SLg increases to the maximum value (0.8) at a point CPg (see FIG. 6) on the circumference of the target region TA. With further increase of the distance Lt after passing the point CPg, the reference reduction coefficient Ksg decreases. When the distance Lt is at a threshold point EPg (see FIG. 6) farther than the reference color cast point SPg, the reference reduction coefficient Ksg is 0.

In addition, as shown in FIG. 7C, as the distance Lt increases from 0, the reference reduction coefficient Ksb along the blue reference straight line SLb increases to the maximum value (0.8) at a point CPb (see FIG. 6) on the circumference of the target region TA. With further increase of the distance Lt after passing the point CPb, the reference reduction coefficient Ksb decreases. When the distance Lt is at a threshold point EPb (see FIG. 6) farther than the reference color cast point SPb, the reference reduction coefficient Ksb is 0.

In this manner, in this embodiment, the reference reduction coefficients Ks are differently set depending on the distance Lt from the ideal point IP even on one reference straight line SL. That is, even for color cast in the same direction, the reference reduction coefficients Ks are differently set depending on a degree of color cast.

In addition, since the reference reduction coefficients Ks are independently set, it is possible to make tendency of the reference reduction coefficients Ks different for each of the reference straight lines SL, as shown in FIGS. 7A to 7C. Specifically, in the target region TA (FIG. 6), if the distance Lt from the ideal point IP is the same, the reference reduction coefficient Kso along the orange reference straight line SLo is set to be smaller than the reference reduction coefficient Ksg along the green reference straight line SLg. This is because color cast in a direction along the orange reference straight line SLo tends not to require strong correction, as compared to color cast in a direction along the green reference straight line SLg. In this manner, in this embodiment, even for the same degree of color cast, the reference reduction coefficients Ks are differently set depending on direction of color cast.

In addition, a distance from the ideal point IP to the threshold point EPo on the orange reference straight line SLo is set to be larger than a distance from the ideal point IP to the threshold point EPg on the green reference straight line SLg. This is because possibility of wrongly detecting pixels having no human skin color as a face region is higher in the direction along the green reference straight line SLg from the ideal point IP than the direction along the orange reference straight line SLo.

In this embodiment, the reference reduction coefficients Ks for red and magenta are set to have about the same tendency as the reference reduction coefficient Kso for orange. On the other hand, the reference reduction coefficient Ks for yellow is set to have the same tendency as the reference reduction coefficient Ksg for green.

Figure 8A:
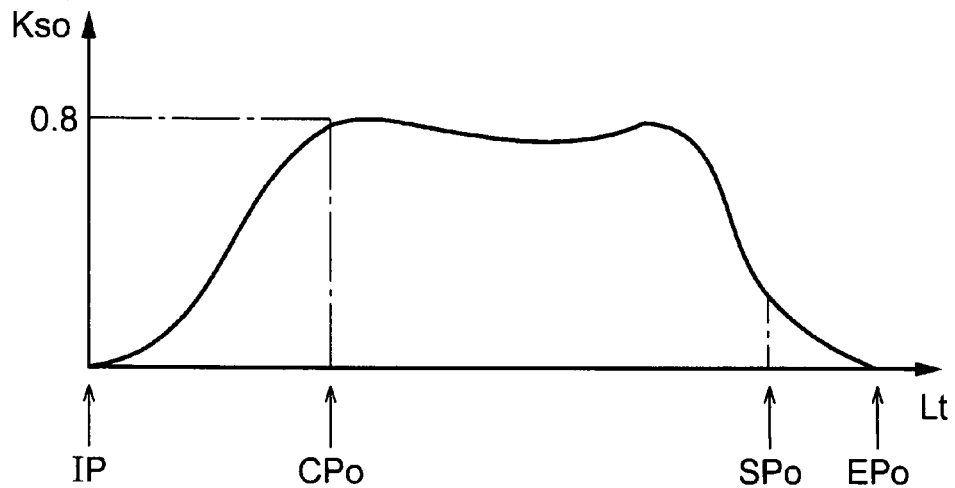
FIGS. 8A, 8B and 8C are explanatory views showing examples of a reference reduction coefficient for display output.
Figure 8B:
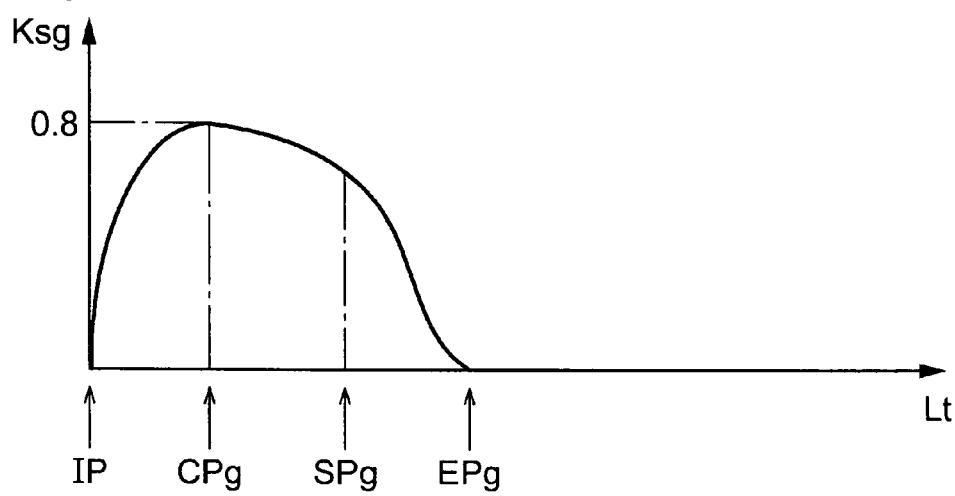
Figure 8C:
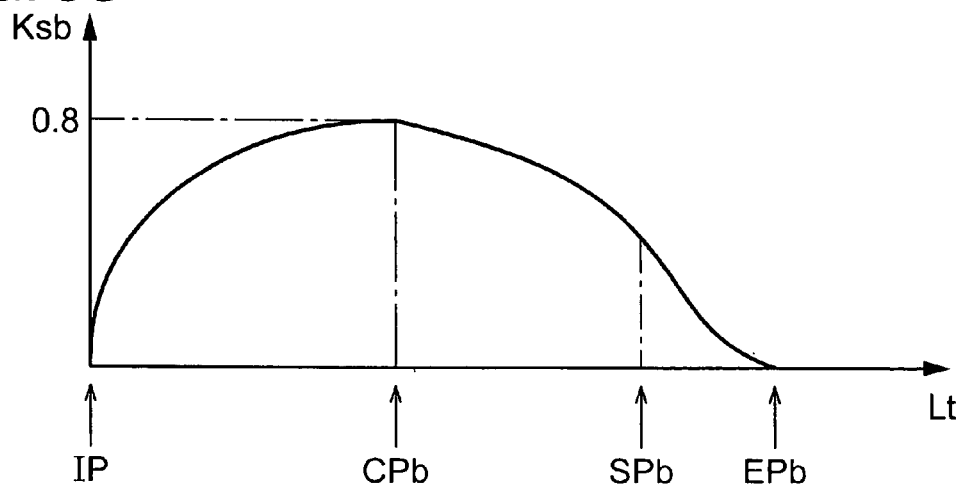

Next, the display output reference reduction coefficient 226 applied for display output will be described with reference to FIGS. 8A, 8B and 8C. FIGS. 8A to 8C are explanatory views showing an example of a reference reduction coefficient 226 (Ks') for display output. Like the print output reference reduction coefficient 224, this reference reduction coefficient Ks' is a reference reduction coefficient set according to a distance from the ideal point IP representing a degree of color cast along the reference straight line SL representing a direction of color cast corresponding to a reference light source. In this embodiment, like the print output reference reduction coefficient 224, 6 reference reduction coefficients Ks' are set along 6 reference straight lines SL. FIG. 8A shows an example of a reference reduction coefficient Kso along the orange reference straight line SLo (FIG. 6), FIG. 8B shows an example of a reference reduction coefficient Ksg along the green reference straight line SLg (FIG. 6), and FIG. 8C shows an example of a reference reduction coefficient Ksb along the blue reference straight line SLb (FIG. 6).

For example, as shown in FIG. 8A, as the distance Lt increases from 0, the reference reduction coefficient Kso along the orange reference straight line SLo increases to the maximum value (0.8) at a point CPo (see FIG. 6) on a circumference of the target region TA. With further increase of the distance Lt, the reference reduction coefficient Kso remains at the maximum value for a while, and thereafter decreases. When the distance Lt is at a threshold point EPo (see FIG. 6) farther than the reference color cast point SPo, the reference reduction coefficient Kso is 0.

In addition, as shown in FIG. 8B, as the distance Lt increases from 0, the reference reduction coefficient Ksg along the green reference straight line SLg increases to the maximum value (0.8) at a point CPg (see FIG. 6) on the circumference of the target region TA. With further increase of the distance Lt after passing the point CPg, the reference reduction coefficient Ksg decreases. When the distance Lt is at a threshold point EPg (see FIG. 6) farther than the reference color cast point SPg, the reference reduction coefficient Ksg is 0.

In addition, as shown in FIG. 8C, as the distance Lt increases from 0, the reference reduction coefficient Ksb along the blue reference straight line SLb increases to the maximum value (0.8) at a point CPb (see FIG. 6) on the circumference of the target region TA. With further increase of the distance Lt after passing the point CPb, the reference reduction coefficient Ksb decreases. When the distance Lt is at a threshold point EPb (see FIG. 6) farther than the reference color cast point SPb, the reference reduction coefficient Ksb is 0.

In this embodiment, the reference reduction coefficient Ksg along the green reference straight line SLg of the display output reference reduction coefficient 226 and the reference reduction coefficient Ksb along the blue reference straight line SLb of the display output reference reduction coefficient 226 are set to increase as compared to those of the print output reference reduction coefficient 224. As a result, when the image is displayed, green color and blue color are strongly corrected as compared to when the same image is printed. These reference reduction coefficients Ks and Ks' may have the form of a table representing reference reduction coefficients corresponding to sampled intervals of the distance Lt or may have the form that parameters representing a proper approximation curve are maintained for respective reference reduction coefficients. Data related to these reference reduction coefficients Ks and Ks' are stored in a predetermined region of the internal memory 200 (FIG. 1).

Figure 9:
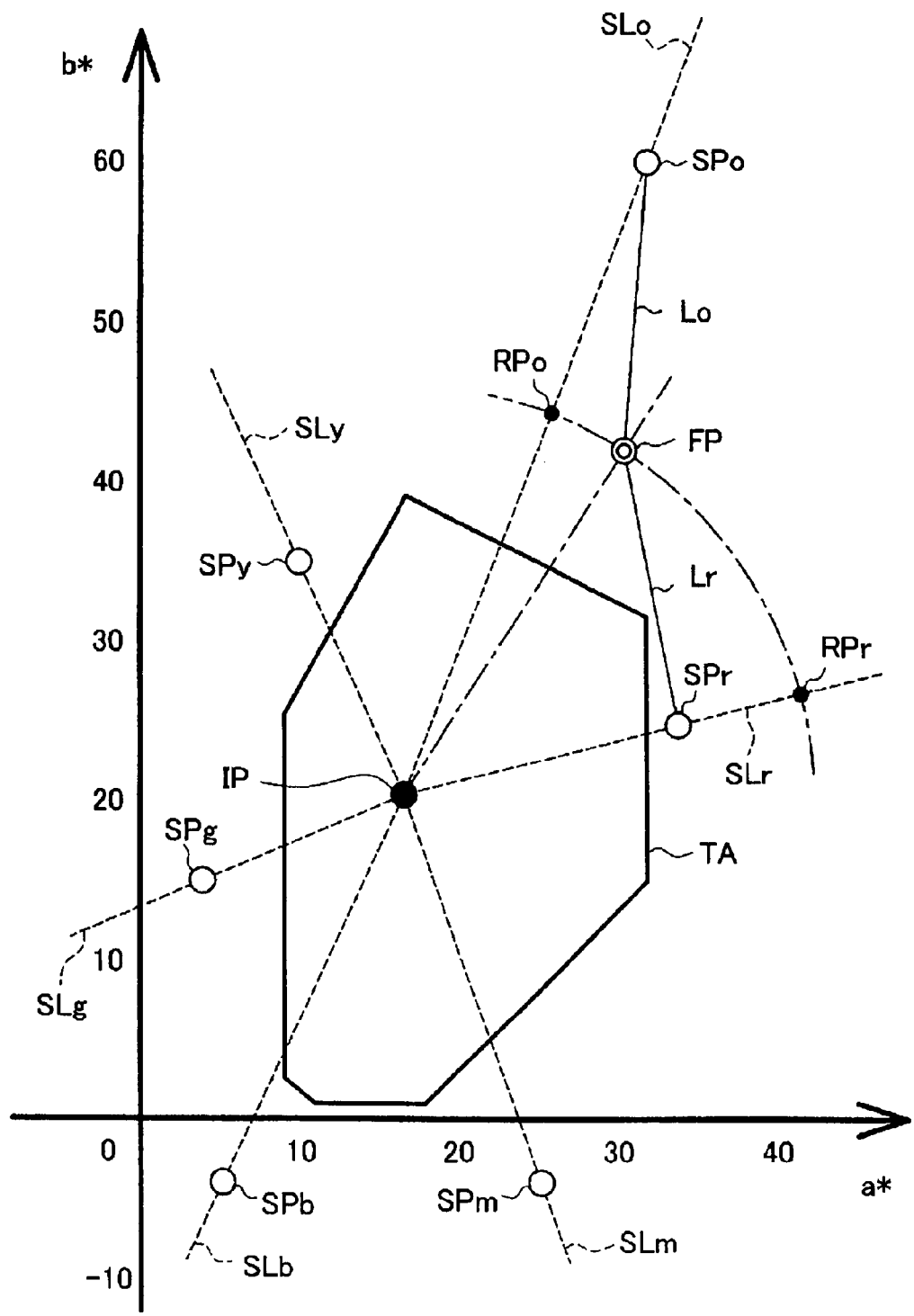
FIG. 9 is an explanatory view showing an example of a reduction coefficient calculating method using a reference reduction coefficient.

The reduction coefficient Kf is calculated using the above-mentioned reference reduction coefficient Ks. FIG. 9 is an explanatory view showing an example of a method of calculating the reduction coefficient Kf using the reference reduction coefficient Ks. If the skin color representative point FP is located on the reference straight line SL, the reference reduction coefficient Ks corresponding to the position of the skin color representative point FP on the reference straight line SL becomes the reduction coefficient Kf. On the other hand, if the skin color representative point FP is not located on the reference straight line SL, the reduction coefficient Kf is calculated using two reference reduction coefficients Ks. These two reference reduction coefficients Ks are reference reduction coefficients Ks along two reference straight lines SL closest to the skin color representative point FP. In the example shown in FIG. 9, the two reference straight lines SL closest to the skin color representative point FP are the orange reference straight line SLo and the red reference straight line SLr. Accordingly, the reference reduction coefficients Ks used to calculate the reduction coefficient Kf are the orange reference straight line SLo and the red reference straight line SLr.

Figure 10A:
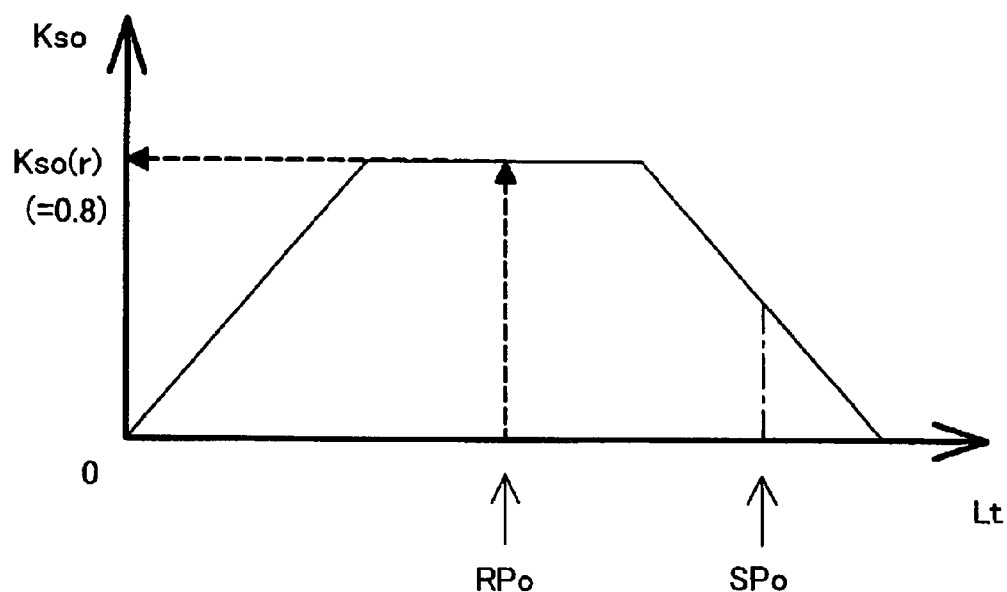
FIGS. 10A and 10B are explanatory views showing examples of a reference reduction coefficient for print output at a reference point.
Figure 10B:
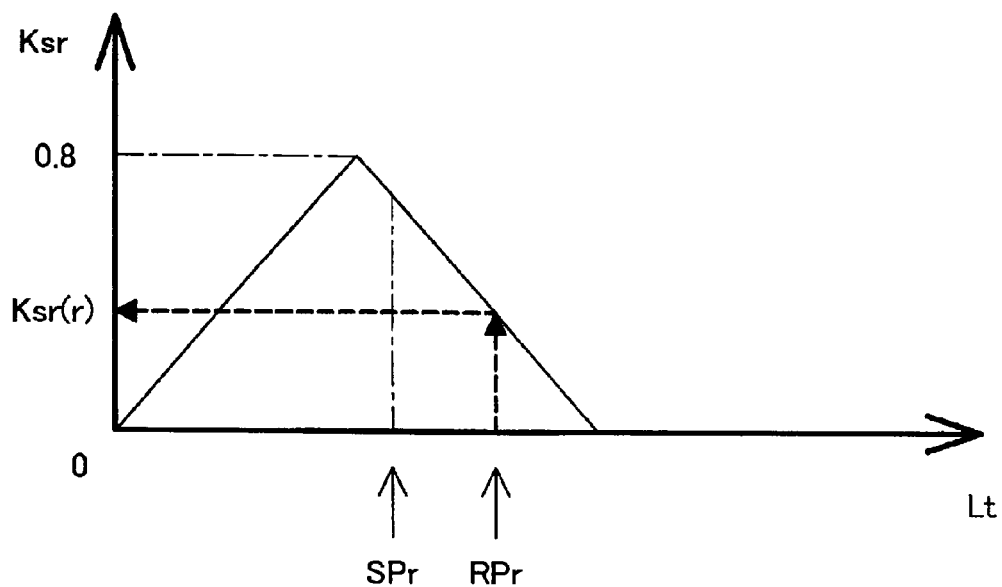

First, the reference reduction coefficients Ks are calculated at points RP to which a distance from the ideal point IP is equal to the distance between the ideal point IP and the skin color representative point FP (the points RP are hereinafter referred to as reference points RP). FIG. 9 shows reference points RP (RPo and RPr) on two reference straight lines SL (SLo and SLr). FIGS. 10A and 10B are explanatory views showing an example of print output reference reduction coefficients Ks at the reference points RP. FIG. 10A shows a reference reduction coefficient Kso (r) at the reference point RPo on the orange reference straight line SLo and FIG. 10B shows a reference reduction coefficient Ksr(r) at the reference point RPr on the red reference straight line SLr.

Next, the reduction coefficient Kf is calculated by weighting the reference reduction coefficients Ks at the two reference points RP depending on a distance between reference color cast points SP corresponding to the reference points RP and the skin color representative point FP, and averaging the weighted reference reduction coefficients Ks. As shown in FIG. 9, assuming that a distance between an orange reference color cast point SPo and the skin color representative point FP is Lo and a distance between a red reference color cast point SPr and the skin color representative point FP is Lr, the reduction coefficient Kf can be calculated according to the following Equation 1.

$$Kf = Kso(r) \times \frac{Lo}{Lo + Lr} + Ksr(r) \times \frac{Lr}{Lo + Lr} \qquad \text{[Equation 1]}$$

As described above, the reduction coefficient Kf is calculated using the reference reduction coefficients Ks. In addition, the reduction coefficient Kf is calculated in the same process for the display output reference reduction coefficients Ks'. In this embodiment, since the reference reduction coefficients Ks are set to fall within a range of 0 to 0.8, the calculated reduction coefficient Kf is also set to fall within the range of 0 to 0.8.

In this embodiment, the reference reduction coefficients Ks on one reference straight line SL can be differently set depending on the distance from the ideal point IP, the reference reduction coefficients Ks can be differently set depending on the degree of color cast. Since the reduction coefficient Kf is calculated using the reference reduction coefficients Ks, the reduction coefficient Kf can be also differently set depending on the degree of color cast. For example, by properly setting the display output reference reduction coefficients Ks', it is possible to make color when the same image is printed substantially equal to color when the same image is displayed. Accordingly, in the printer 100 according to this embodiment, the color balance correction can be preferably performed depending on the degree of color cast.

In addition, since the process of extracting a face region from an input image and calculating the converted skin color representative value FVc is a common process irrespective of an output site, a displayed image can be printed at a high speed as compared to when the color balance correction is performed on every output.

In addition, in this embodiment, since tendency of the reference reduction coefficients Ks becomes different for every reference straight line SL, even for the same degree of color cast, the reference reduction coefficients Ks can be differently set depending on direction of color cast. Since the reduction coefficient Kf is calculated using the reference reduction coefficients Ks, the reduction coefficient Kf can be also differently set depending on the direction of color cast. For example, when an image is displayed, since green color and blue color are strongly corrected, it is possible to decrease an image color difference occurring due to an individual difference of a display unit. Accordingly, in the printer 100 according to this embodiment, the color balance correction can be preferably performed depending on the direction of color cast.

In addition, in this embodiment, since the reference reduction coefficients Ks are calculated using pre-set reference reduction coefficients Ks, the reduction coefficient Kf can be easily calculated at a high speed. In addition, since the tendency of the reduction coefficient Kf can be easily set depending on a tendency of a color cast, the preferred color balance correction can be easily set.

Although the invention has been described through the shown embodiment, the invention is not limited to the embodiment but may be modified in various ways as follows.

(1) Although the reduction coefficient Kf is calculated from the skin color representative value FVc using the reference reduction coefficients Ks in this embodiment, a relationship between the skin color representative value FVc (or skin color representative value FV) and the reduction coefficient Kf may be beforehand calculated and tabulated. This contributes to a high-speed color balance correction.

(2) The method of calculating the reduction coefficient Kf using the reference reduction coefficients Ks is merely provided as an example in the above embodiment. Alternatively, other methods for calculating the reduction coefficient Kf using the reference reduction coefficients Ks may be employed. For example, although the reduction coefficient Kf is calculated using two of 6 set reference reduction coefficients Ks in the above embodiment, the reduction coefficient Kf may be calculated using one or three or more reference reduction coefficients Ks. In addition, although the reduction coefficient Kf is calculated by weighting the reference reduction coefficients Ks and averaging the weighted reference reduction coefficients Ks depending on the distance between the skin color representative point FP and the reference color cast point SP in the above embodiment, the reference reduction coefficients Ks may be weighted and averaged depending on a distance between the skin color representative point FP and the reference point RP. In addition, although 6 reference reduction coefficients Ks are set in the above embodiment, the number of reference reduction coefficients Ks is not particularly limited. For example, the number of reference reduction coefficients Ks may be less than 5 or more than 7.

(3) In addition, the reference reduction coefficients Ks are provided as an example in the above embodiment, and, however, may be set to have different values. For example, although the reference reduction coefficients Ks are set to fall within the range of 0 to 0.8 in the above embodiment, the reference reduction coefficients Ks may be set to fall within a different range, for example, a range of 0 to 1.0.

(4) Although the a*-b* plane is used as a plane expressing color and saturation in the above embodiment, a different plane such as a u*-v* plane may be used as the plane expressing color and saturation.

(5) Although the face region is used as a region of human skin expressed in an image in the above embodiment, regions other than the face region may be used as the region of human skin expressed in the image.

What is claimed is:

1. An image processing method of performing a color balance correction on an image, the method comprising:
    determining a first value representing color and saturation of a pixel in a skin color region of the image;
    generating a correction amount based on the first value, a second value representing ideal color and saturation of skin, and an adjusting value for adjusting a degree of the color balance correction;
    performing the color balance correction on the image based on the correction amount; and
    outputting the corrected image to a display or a printer,
    wherein the correction amount is varied depending on whether an output apparatus that outputs the corrected image is the display or the printer, and
    wherein each operation of the image processing method is executed by a processor.

2. The image processing method according to claim 1, wherein
    the adjusting value is a reduction coefficient that reduces a difference between the first value and the second value.

3. The image processing method according to claim 2, wherein
    the reduction coefficient, based on a reference reduction coefficient, depends on the first value, and
    the reference reduction coefficient, based on a plurality of positions on a plane expressing color and saturation, is varied depending on the output apparatus.

4. The image processing method according to claim 3, further comprising:
    receiving the reference reduction coefficient depending on the output apparatus.

5. The image processing method according to claim 4, wherein
    the reference reduction coefficient is a value based on at least information related to an output characteristic of the output apparatus and a human face.

6. The image processing method according to claim 5, wherein
    the information related to the human face includes information related to the number of humans and position of the human face in the image.

7. The image processing method according to claim 6, wherein
    the reference reduction coefficient strongly corrects at least one of green and blue color in an RGB signal representing red, green and blue color.

8. An image processing system, including an image processing apparatus for performing a color balance correction on an image and an output apparatus for outputting the corrected image to a display or a printer, the image processing system comprising:
  a determiner, configured to determine a first value representing color and saturation of a pixel in a skin color region of the image; and
  a correction processor, configured to perform the color balance correction on the image based on the determined first value, a second value representing ideal color and saturation of skin, and a reduction coefficient, wherein
  the reduction coefficient depends on the first value based on a reference reduction coefficient, and
  the reference reduction coefficient is varied depending on whether the output apparatus is the display or the printer, based on a plurality of positions on a plane expressing color and saturation.

9. An image processing apparatus for performing a color balance correction on an image, the image processing apparatus comprising:
  a processor;
  a determining unit, configured to determine a first value representing color and saturation of a pixel in a skin color region of the image;
  a correction processing unit, configured to perform the color balance correction on the image based on the determined first value, a second value representing ideal color and saturation of skin, and a reduction coefficient; and
  an output unit, configured to output the corrected image to a display or a printer, wherein
  the reduction coefficient depends on the first value based on a reference reduction coefficient, and
  the reference reduction coefficient is varied depending on whether an output apparatus is the display or the printer, based on a plurality of positions on a plane expressing color and saturation.

* * * * *